(12) United States Patent
Kitagawa

(10) Patent No.: US 9,461,280 B2
(45) Date of Patent: Oct. 4, 2016

(54) BATTERY COUPLING METHOD AND BATTERY COUPLING DEVICE

(71) Applicant: Nissan Motor Co., Ltd., Yokohama, Kanagawa (JP)

(72) Inventor: Shinichiro Kitagawa, Atsugi (JP)

(73) Assignee: Nissan Motor Co., Ltd., Yokohama (JP)

(*) Notice: Subject to any disclaimer, the term of this patent is extended or adjusted under 35 U.S.C. 154(b) by 211 days.

(21) Appl. No.: 14/351,217

(22) PCT Filed: Dec. 27, 2012

(86) PCT No.: PCT/JP2012/083935
§ 371 (c)(1),
(2) Date: Apr. 11, 2014

(87) PCT Pub. No.: WO2013/100077
PCT Pub. Date: Jul. 4, 2013

(65) Prior Publication Data
US 2014/0230226 A1    Aug. 21, 2014

(30) Foreign Application Priority Data
Dec. 29, 2011   (JP) .................... 2011-290356

(51) Int. Cl.
*B23P 11/00*   (2006.01)
*H01M 2/10*   (2006.01)
*H01M 10/04*   (2006.01)

(52) U.S. Cl.
CPC ............. *H01M 2/10* (2013.01); *B23P 11/005* (2013.01); *H01M 2/1061* (2013.01); *H01M 2/1072* (2013.01); *H01M 10/0404* (2013.01); *Y10T 29/49915* (2015.01); *Y10T 29/53439* (2015.01)

(58) Field of Classification Search
CPC .. H01M 2/10; H01M 2/1061; H01M 2/1072; H01M 10/0404; B23P 11/005; Y10T 29/53439; Y10T 29/49915
See application file for complete search history.

(56) References Cited

U.S. PATENT DOCUMENTS

| 5,047,896 A | 9/1991 | Zust |
| 5,095,606 A | 3/1992 | Barrick |
| 6,242,128 B1 | 6/2001 | Tura et al. |
| 6,467,326 B1 | 10/2002 | Garrigus |
| 2004/0031568 A1 | 2/2004 | Lin |
| 2011/0287301 A1 | 11/2011 | Kim et al. |

FOREIGN PATENT DOCUMENTS

| CN | 201500760 U | 6/2010 |
| DE | 102004039192 B3 | 1/2006 |
| JP | 2004-158344 A | 6/2004 |

(Continued)

*Primary Examiner* — Ryan J Walters
(74) *Attorney, Agent, or Firm* — Global IP Counselors, LLP

(57) ABSTRACT

A battery coupling method is provided for coupling a support member to a battery cell for supporting the battery cell provided with a group of electrodes. The battery coupling method includes: passing a protrusion part formed on the support member through a hole formed in the battery cell; pressing the support member using a pressing unit that approaches the support member from a side where a heating unit is positioned; heating a tip end of the protrusion part using the heating unit to form a heat-deformed part of a size which prevents extraction of the protrusion part from the hole; separating the heating unit from the heat-deformed part after the pressing and heating of the tip end of the protrusion part; and separating-the pressing unit from the support member after the pressing and heating of the tip end of the protrusion part.

5 Claims, 15 Drawing Sheets

(56) References Cited

FOREIGN PATENT DOCUMENTS

| JP | 2004-356027 A | 12/2004 |
| JP | 2006-100064 A | 4/2006 |
| JP | 2006-114406 A | 4/2006 |
| JP | 2006-302715 A | 11/2006 |
| JP | 2007-073510 A | 3/2007 |
| JP | 2007-172893 A | 7/2007 |
| JP | 2008-147045 A | 6/2008 |

BATTERY COUPLING METHOD AND BATTERY COUPLING DEVICE

CROSS-REFERENCE TO RELATED APPLICATIONS

This application is a U.S. National stage application of International Application No. PCT/JP2012/083935, filed Dec. 27, 2012, which claims priority to Japanese Patent Application No. 2011-290356 filed in Japan on Dec. 29, 2011, the contents of which are hereby incorporated herein by reference.

BACKGROUND

1. Field of the Invention

The present invention relates to a battery coupling method and a battery coupling device for coupling or connecting a support member to a battery cell for supporting the battery cell.

2. Background Information

In recent years, in battery cells used in various types of batteries such for a vehicle battery, solar cells, or electronic equipment cells, a group of electrodes representing a battery element is sealed by an exterior or outer member comprised of a deformable and flexible laminate sheet. An electrode terminal is led to the outside of the battery cell from the outer member (for example, see Japanese Patent Application Publication No. 2007-73510 A). In the battery cell described in Japanese Patent Application Publication No. 2007-73510 A, a frame member (support member) is coupled to a part at which the electrode lead is placed. By stacking and connecting each frame member, which is coupled to a plurality of battery cells, each cell member will be supported.

SUMMARY

By way of fastening the support member to the battery cell having an outer flexible and deformable member such as a laminate sheet, it is assumed that a high temperature iron is pressed to the support member to thermally or heat-deform the support member for heat deformation to thereby fastening the support member and the outer or package member.

However, when peeling the iron off the heat-deformed part after the support member has been heat deformed, there is a possibility that the heat-deformed part is in a state of being welded to the iron. Thus, the support member may be lifted and an undesirable force may act on the support member so that part of the support member such as the heat-deformed part may be broken or damaged.

The present invention has been made to solve the problems described above. Specifically, a battery coupling method or a battery coupling device is provided, which, when coupling a support member to a battery cell for supporting the battery cell, can alleviate or suppress the breakage of the support member.

A battery coupling method according to the present invention resides in a battery coupling method for coupling a support member to a battery cell provided with a group of electrodes and includes a heating step, a pressing step, a heating unit separation step, and a pressing piece separation step. In the heating step, a protrusion part formed on the support member is caused to pass through a hole formed in the battery cell, and the protrusion part is pressed from the tip side thereof by a heating unit to form a heat-deformed part. The heat-deformed part is formed such that at least a part of the tip end of the protrusion part protrudes from the hole so as to acquire a size which prevents extraction from the hole. In the pressing step, the support member is pressed by a pressing piece which approaches the spacer from the side where the heating unit is positioned. In the heating unit separation step, after the pressing step, the heated unit is separated from the heat-deformed part. In the pressing piece separation step, after the heating unit separation step, the pressing piece will be separated from the support member.

According to the battery coupling method of the present invention, at the time of separating or detaching the heating unit from the heat-deformed part, since the support member is pressurized by the pressing piece, the support member will be prevented from being lifted and undesirable forces are less likely to act on the support member, and damage on the support member such as thermal deformation may be alleviated.

BRIEF DESCRIPTION OF THE DRAWINGS

Referring now to the attached drawings which form a part of this original disclosure.

DETAILED DESCRIPTION OF THE EMBODIMENTS

Figure 1:
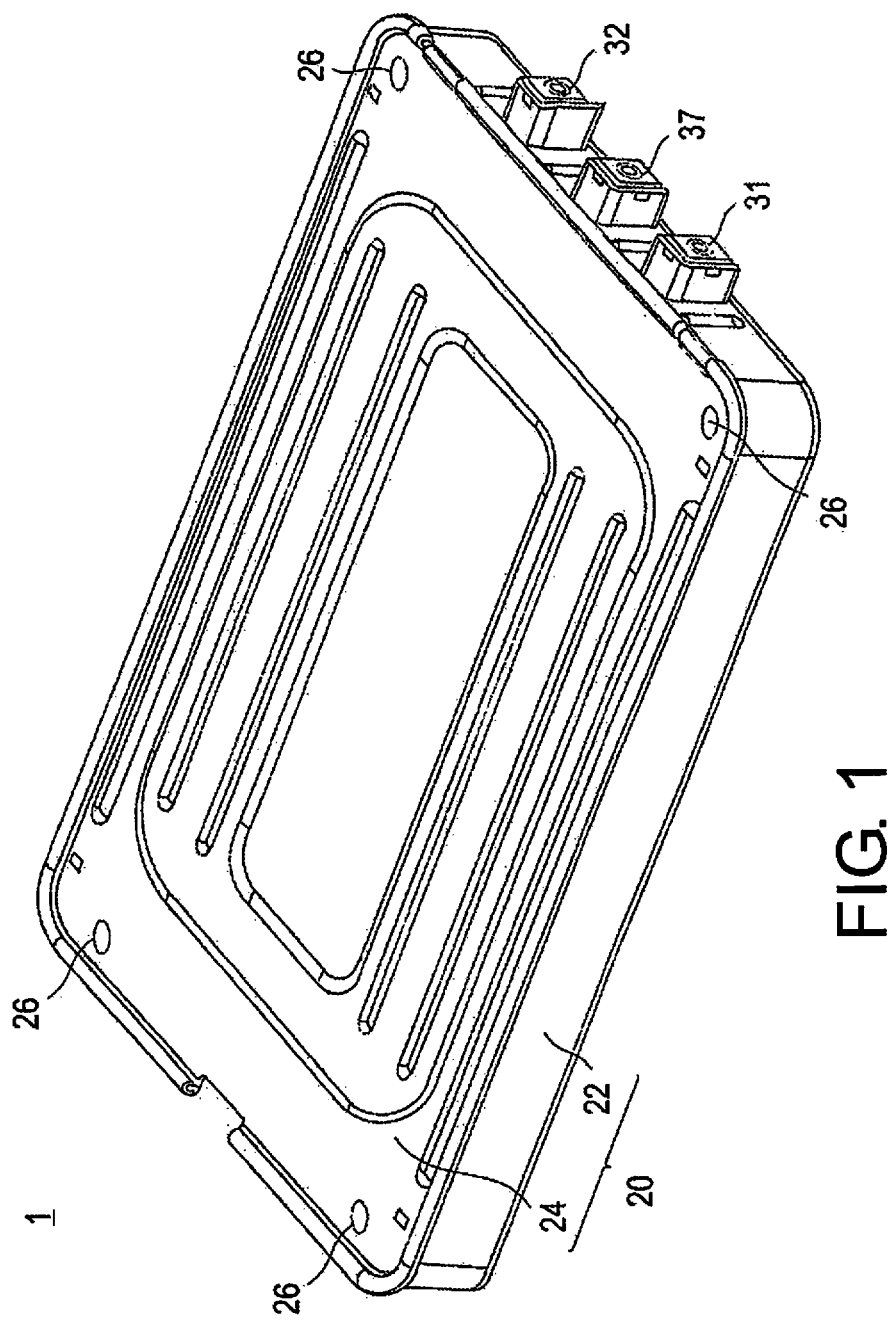
FIG. 1 is a perspective view showing a battery module.

Hereinafter, with reference to the accompanying drawings, an embodiment of the present invention is described. The same reference numerals will be given to the same elements, and redundant description will be omitted in the description of the drawings. Size ratios in the drawings may be exaggerated for convenience of explanation and thus may differ from the actual ratio.

Figure 2:
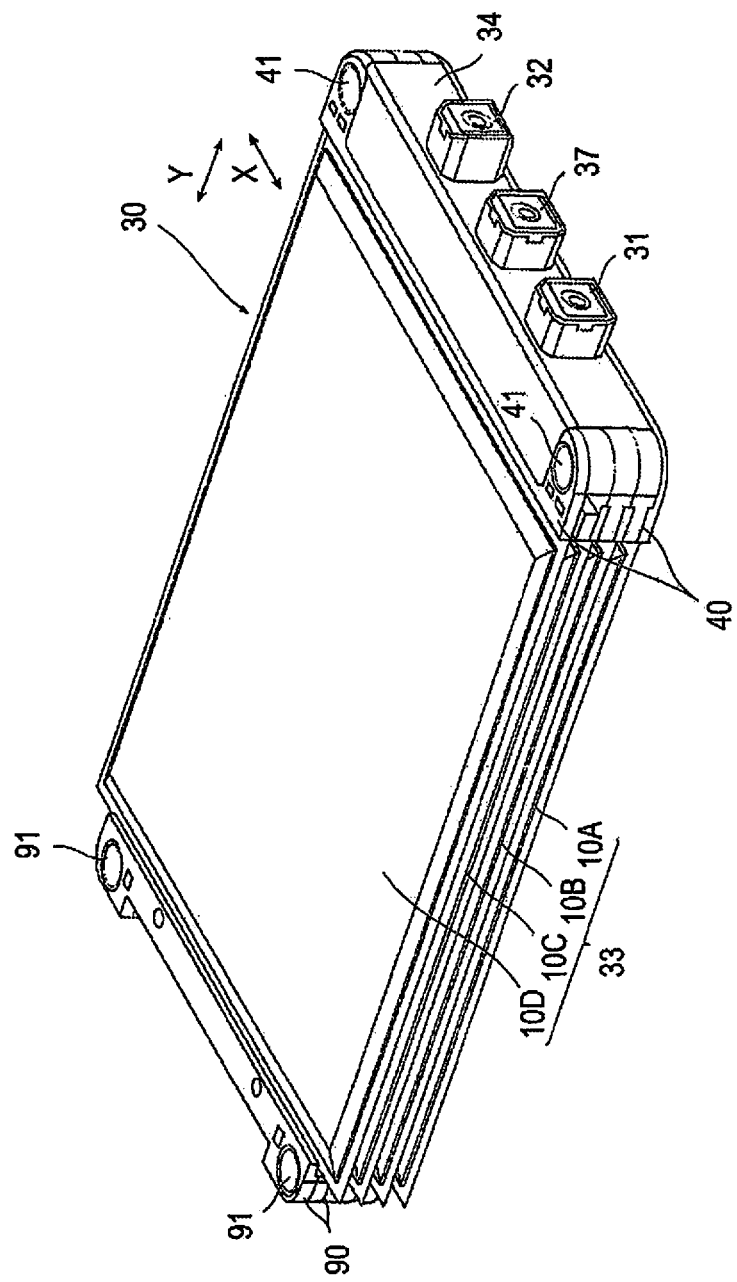
FIG. 2 is a perspective view showing a cell unit inside a case of the battery module.

With reference to FIGS. 1 and 2, a battery module 1 accommodates, inside a case 20, a cell unit 30 including one or more the battery cells 10 (10A to 10D), four in this embodiment, which are connected in series or parallel, and an insulating cover 34 having an electrical insulating property. The battery module 1 may be used alone. However, for example, by the parallelization and/or serialization of a plurality of the battery modules 1, a battery assembly corresponding to desired current, voltage or capacity can be configured.

The case 20 has a lower case 22 of a substantially rectangular, box shape and an upper case 24 forming a lid. The edge portion of the upper case 24 is tightened around the edge of the peripheral wall of the housing 22 by crimping. The lower case 22 and the upper case 24 are formed from a steel or aluminum plate of relatively thin thickness. The lower case 22 and the upper case 24 have a through hole 26. The through hole 26 is disposed at four positions of the corner parts and the through hole 26 is used for inserting through bolts (not shown) to hold a battery assembly formed of a plurality of battery modules 1 stacked on one another. Reference numerals 31, 32 denote an output terminal which is disposed to protrude from the opening in the front of the lower case 22.

The cell unit 30 includes a stack or laminated body 33 which are stacked with a plurality of battery cells 10 with electrically connected and a plurality of spacers 40, 90 (support member) that supports the battery. The spacers 40 and 90 may be formed using a resin material of electrical insulating property. The spacer 40 is disposed on the front side of the stack 33, the spacer 90 is disposed on the back side of the stack 33.

Figure 3:
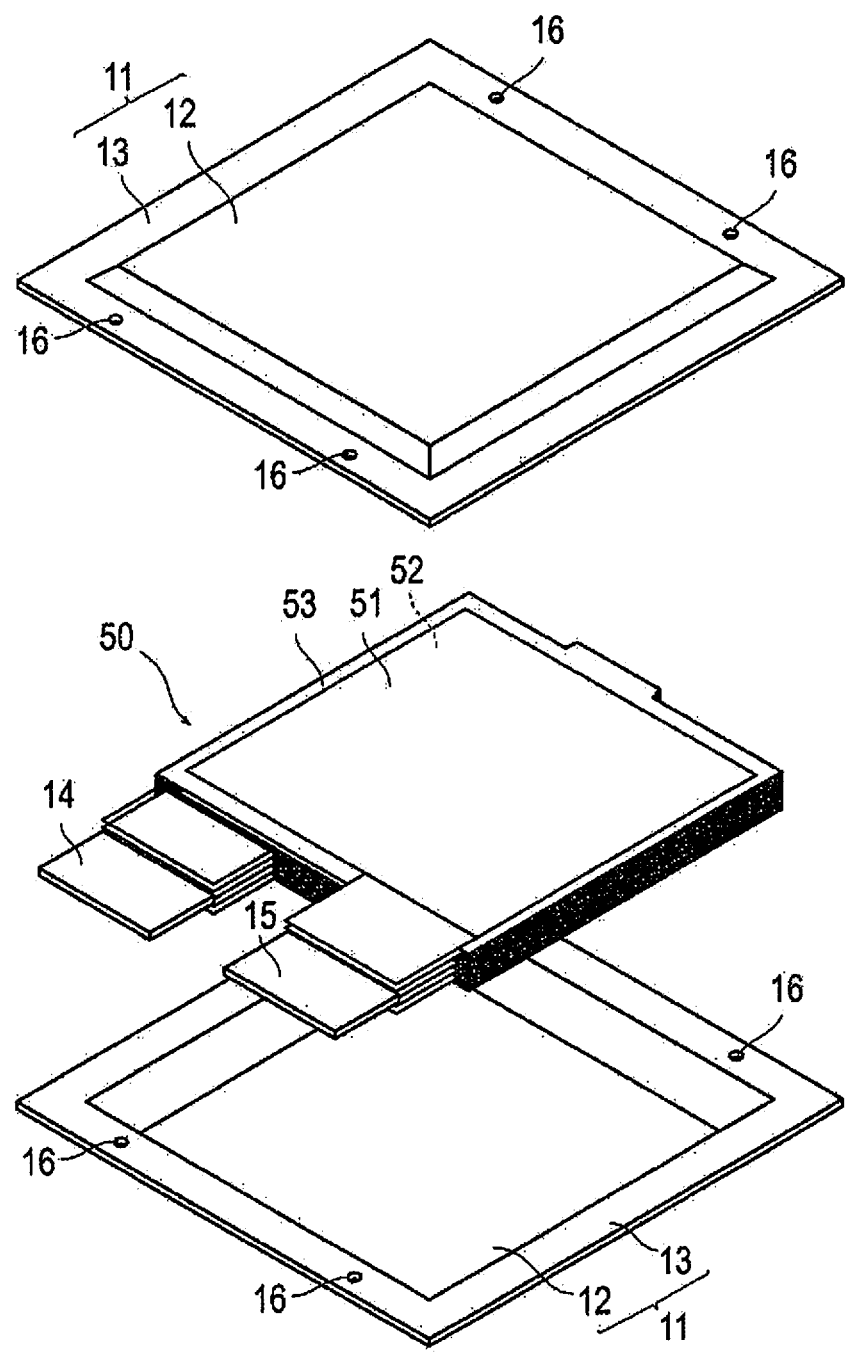
FIG. 3 is an exploded perspective view showing a flat battery.

As shown in FIG. 3, the battery cell 10 is, for example, a lithium ion secondary battery, and a stacked electrode assembly 50 is accommodated with an electrolyte solution in an exterior member 11. The battery cell 11 has a positive electrode tab 14a (electrode tab) and a negative electrode tab 15 (electrode tab), which are led to the outside of the exterior member 11.

The stacked electrode assembly 50 is a group of electrodes, which is formed by sequentially stacking a positive electrode 51, a negative electrode 52, and a separator 53. The positive electrode 51 has a positive electrode active material layer made of a lithium-transition metal composite oxide like $LiMn_2O_4$, etc. The negative electrode 52 has a negative electrode active material layer made of carbon or lithium-transition metal composite oxide. For example, the separator 52 is formed of porous PE (polyethylene) having air permeability that can penetrate the electrolyte.

The exterior member 11 is formed of seat material such as a polymer-metal composite laminate film, in which metal such as aluminum, stainless steel, nickel or copper (including alloy thereof) is coated with insulating material such as a polypropylene film, from the viewpoint of thermal conductivity and light weight. The exterior member 11 includes a body portion covering the stacked or laminated electrode assembly 50 and an outer peripheral portion 13 extending to the periphery of the body portion 12 and a part or all of the outer peripheral portion 13 is joined by heat fusion. On the two sides of the exterior member 11 to which the spacers 40, 90 are connected, two holes 16 are formed through which the protrusion parts 43, 93 (see FIG. 6) formed on the spacers 40, 90 pass through.

Figure 4:
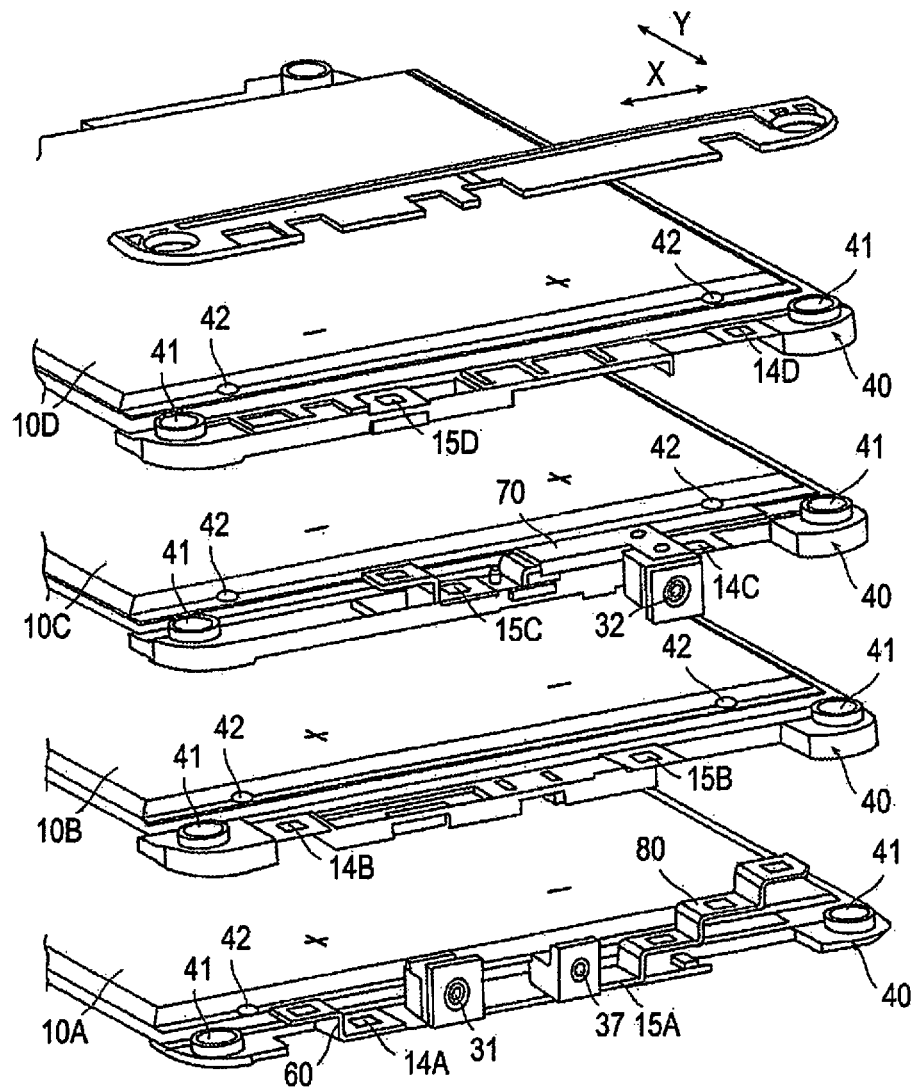
FIG. 4 is an exploded perspective view showing the internal structure of the battery module.
Figure 5:
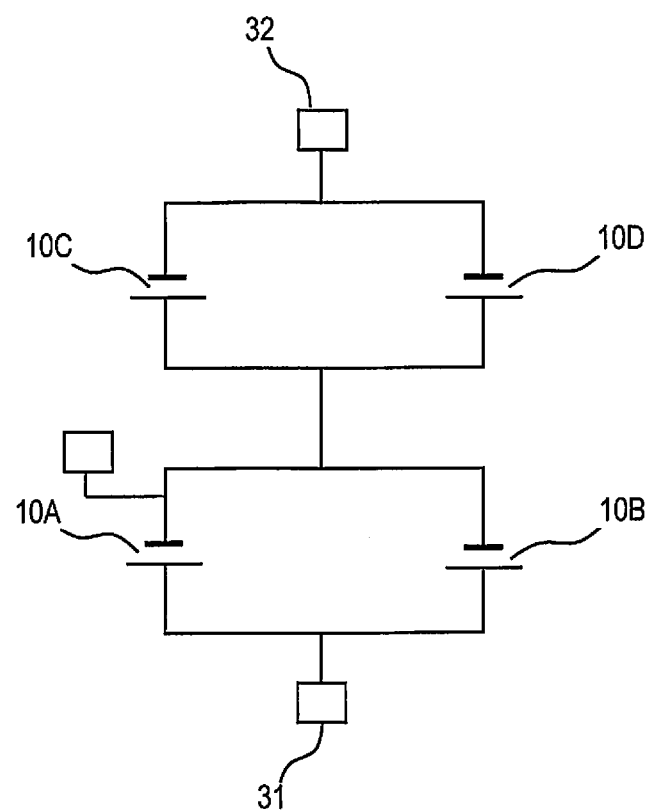
FIG. 5 is a diagram showing an electrical connection configuration of a plurality of battery cells constituting the battery module.

As shown in FIG. 4, the spacer 40 has a through hole 41 at both ends in the longitudinal or elongated direction X. The through hole 41 is used to be aligned with the through hole 26 on the front side of the lower case 22 and the upper case 24 for insertion of a through bolt. The spacer 40 is formed with, as aligned in the longitudinal direction X of the spacer 40, two heat-deformed parts 42 (see FIGS. 8, 14) which undergo heat deformation by heating and pressing the protrusion part 43 passing through the hole 16 of the exterior member 11. The heat-deformed part 42 is heat deformed and has a size which prevents extraction or withdrawal from the hole 16 of the exterior member 11 so as to couple the battery cell 10 and the spacer 40.

Further, the spacer 90 has a through hole 91 at both ends in the longitudinal or elongated direction X. The through hole 91 is used to be aligned with the through hole 26 on the back side of the lower case 22 and the upper case 24 for insertion of a through bolt. The spacer 90 is formed with, as aligned in the longitudinal direction X of the spacer 90, two heat-deformed parts 92 (see FIGS. 8, 14) which undergo heat deformation by heating and pressing the protrusion part 93 passing through the hole 16 of the exterior member 11. The heat-deformed part 92 is heat deformed and has a size which prevents extraction or withdrawal from the hole 16 of the exterior member 11 so as to couple the battery cell 10 and the spacer 90.

The positive electrode tab 14 and the negative electrode tab 15 are members that draw current from the stacked electrode assembly 50 and extend to one side of the battery cell 10.

As shown in FIG. 4, the positive electrode tab 14A of a first battery cell 10A and the positive electrode tab 14B of a second battery cell 10B are joined by ultrasonic welding to a bus bar 60 which in turn is connected electrically to an external output positive electrode terminal 31. On the other hand, the negative electrode tab 15A of the first battery cell 10A and the negative electrode tab 15B of the second battery cell 10B are joined, together with the positive electrode tab 14C of a third battery cell 10C and the positive electrode tab 14D of a fourth battery cell 10D, to a bus bar 80 by ultrasonic welding, which in turn is connected electrically to a voltage detection terminal 37. Further, the negative electrode tab 15C of the third battery cell 10C and the negative electrode tab 15D of the fourth battery cell 10D are joined by ultrasonic welding to a bus bar 70 which in turn is connected to an external output negative electrode terminal 32.

As described above, through the bus bars 60, 70, 80, by connecting each electrode tabs 14A to 14D, 15A to 15D of the battery cells 10A to 10D to the external output positive terminal 31, the external output negative terminal 32, and the voltage detection terminal 37, respectively, these battery cells 10A to 10D form a connection structure of two-parallel and two-series.

The voltage detection terminal 37 is a terminal used for detecting a voltage of the battery cells 10A to 10D constituting the battery module 1. In particular, the voltage of the first battery cell 10A and the second battery cell 10B may be detected by using the external output positive terminal 31 and the voltage detection terminal 37 to measure the voltage between these terminals, Further, the voltage of the third battery cell 10C and the voltage of the fourth battery cell 10D may be detected by using the external output negative terminal 32 and the voltage detection terminal 37 to measure the voltage between these terminals.

Now, description is given of a battery coupling device 100 according to the present exemplary embodiment.

The battery coupling device 100 is intended to be a device for coupling spacers 40, 90 to the battery cell 10 for supporting the battery cell 10.

Figure 6:
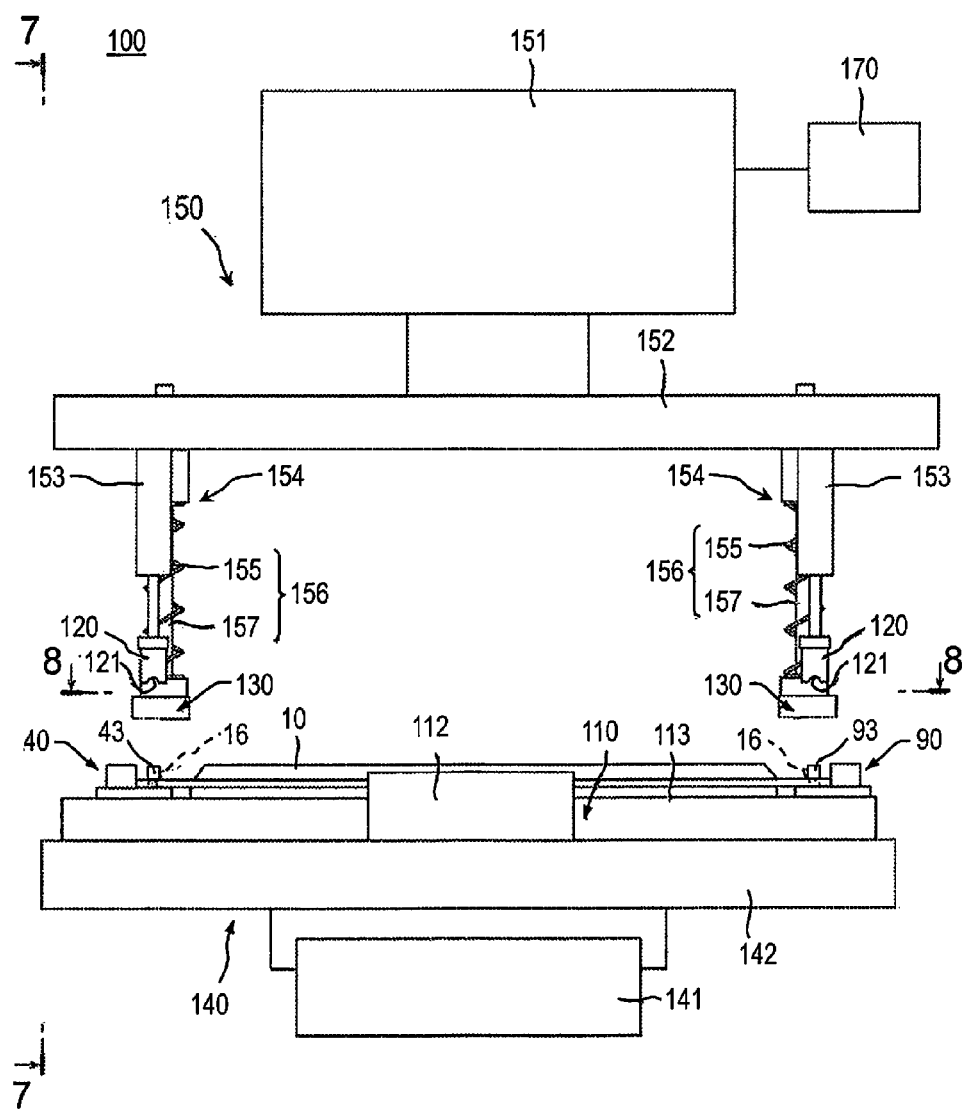
FIG. 6 is a front view showing a battery coupling device pertaining to one exemplary embodiment.
Figure 7:
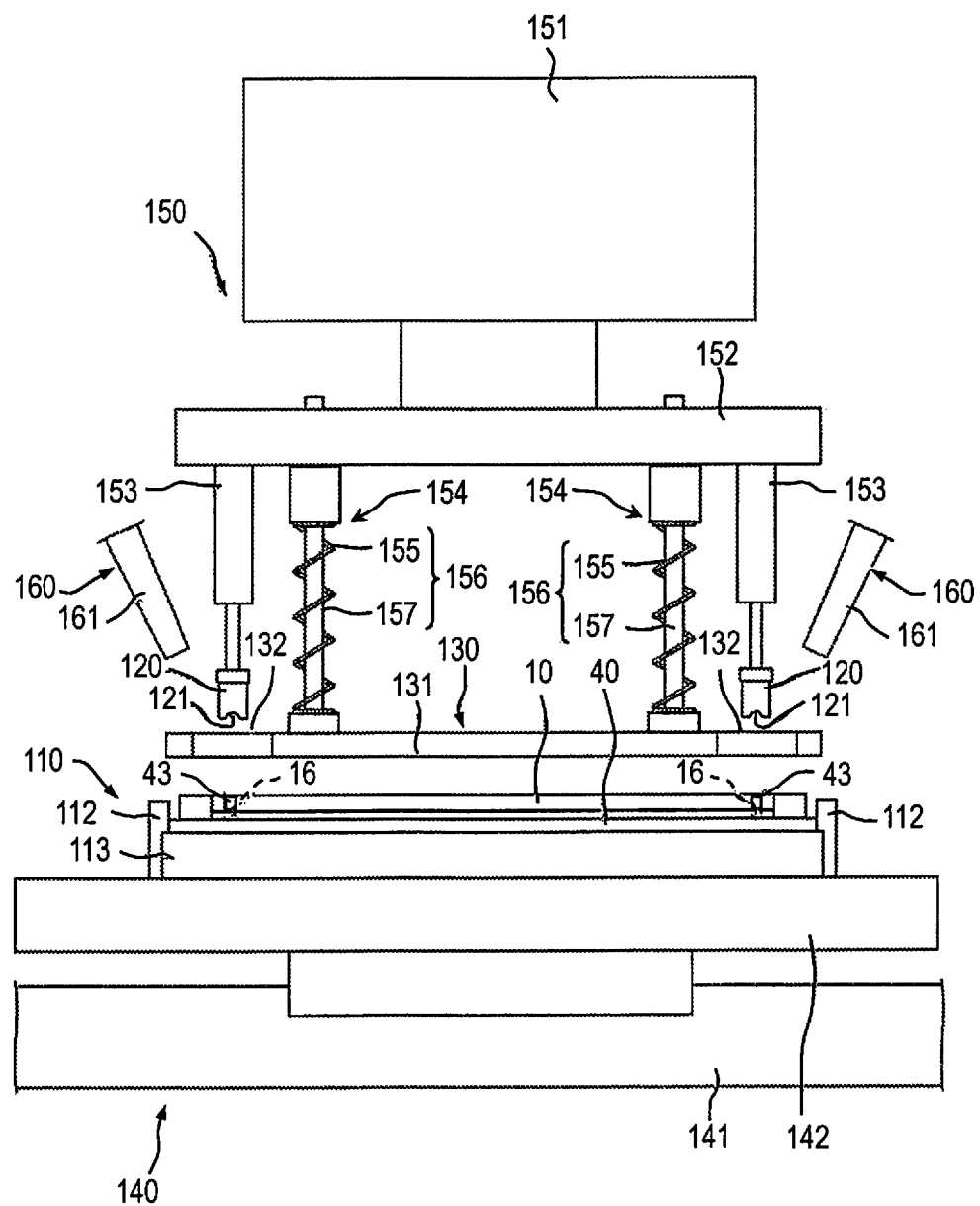
FIG. 7 is an arrow view taken along line 7-7 of FIG. 6.
Figure 8:
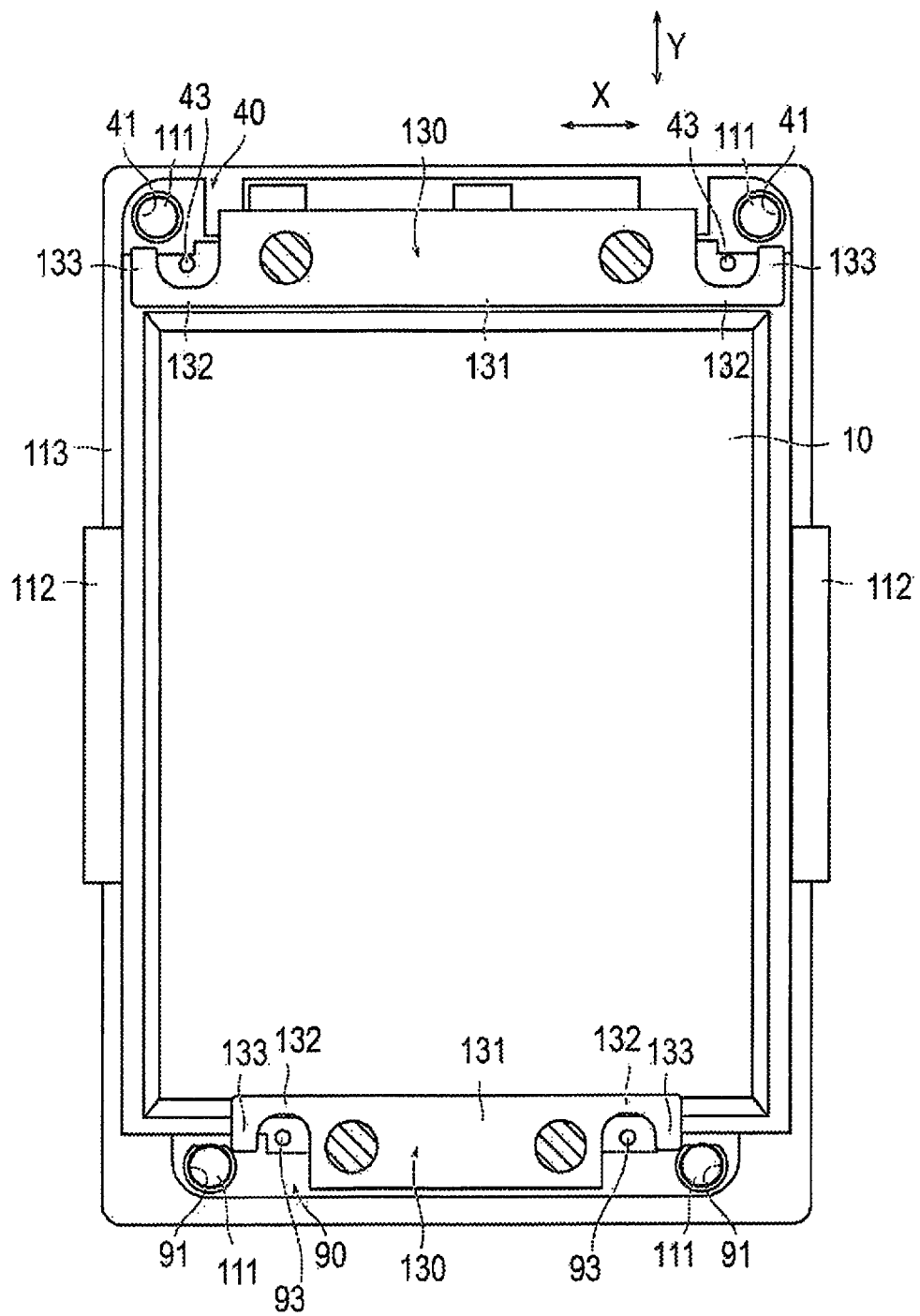
FIG. 8 is a sectional view taken along line 8-8 in FIG. 6.
Figure 9:
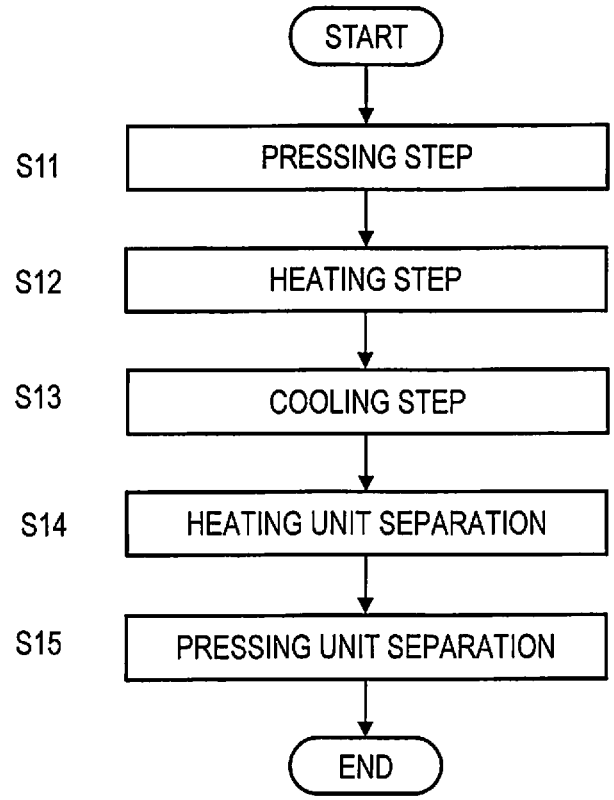
FIG. 9 is a flow chart illustrating a method for coupling a spacer to the battery by the battery coupling device pertaining to the embodiment.

As shown in FIGS. 6 to 8, the battery coupling device 100 includes a pallet 110 for mounting the spacer 40 and the battery cell 10 and a conveying means 140 for holding and transporting the pallet 110. Further, a heating unit 120 for heat deforming a portion of the spacers 40, 90, a pressing piece 130 for contacting and pressurizing the spacers 40, 90, a pressurizing mechanism 150 for operating the heating unit 120 and the pressing piece 130 cooperatively, a cooling unit 160, and a control unit 170.

The pallet 110 includes a plate-shaped holding part 113 for holding the spacers 40, 90 and the battery cell 10, a spacer fixing pin 111 for fixing the spacers 40, 90 by being inserted through the through holes 41 and 91 of the spacers 40, 90, and a battery holder 112 for holding side edges of the battery cell 10.

As shown in FIGS. 6 and 7, the conveying means or transport unit 140 is movable along a guide rail 141 extending substantially horizontally and has a pallet holding unit 142 on which the pallet 110 may be mounted. Note that the conveying means 140 is not limited to a specific structure, but a conveyor or the like may be used as long as the pallet 110 can be transported.

The pressurizing mechanism 150 is provided with a pressing means 151 as a driving source, a support beam 152 for raising and lowering movement by the pressing unit 151, a heating unit supporting portion 153 which supports the heating unit 120 while being connected to the support beam 152, and a pressing piece support portion 154 for supporting the pressing piece 130 while being connected to the support beam 152.

The pressing unit 151 is constituted by a hydraulic cylinder or the like. Note that the driving source is not limited to the hydraulic cylinder, but may be a pneumatic cylinder or an electric motor, for example.

The support beam 152 is movable up and down and is connected to the pressing unit 151, and is formed so as to extend substantially horizontally to a position corresponding to the two spacers 40 and 90.

The heating unit supporting portion 153 is provided at two positions corresponding to the two protrusion part 43 of the spacer 40 as well as at two positions corresponding to the two protrusion part 93 of the spacer 90. Each heating unit supporting portion 153 is structured to extend downwardly from the support beam 152. The heating unit 120 is fixed to the lower end of each heating unit supporting portion 153.

The pressing piece supporting portion 154 is provided at two positions corresponding to each of the spacer 40 and 90. Each pressing piece supporting portion 154 is provided with two spring mechanism 156 having a spring 155 as an elastic body. The pressing piece 130 is fixed to the lower end of the spring mechanism 156.

The spring mechanism 156 has a slide rod 157 slidable inside the through hole formed in the support beam 152. The pressing piece 130 is fixed to the lower end of the slide rod 157. The spring mechanism 156 biases downwardly the pressing piece 130 movable or retractable forward or backward with respect to the support beam 152 by a spring 155. The pressing piece 130 may be positioned below the heating unit 120 with the spring 155 being extended, and is located above the heating unit 120 with the spring 155 being contracted.

The heating unit 120 is formed with a recess 121 on the lower surface. The heating unit 120 is thus configured to heat the protrusion parts 43, 93 of the spacers 40, 90 to fuse or soften while pressing the protrusion parts 43, 93 from the tip side thereof in order for at least a part of the tip end of the protrusion part to protrude or bulge, at the side to which the protrusion parts 43, 93 of the spacers 40, 90 protrude, from the inner periphery of the hole 16 so as to be heat deformed to acquire a size which prevents extraction from the hole 16.

As shown in FIGS. 7 and 8, the pressing piece 130 has a first pressing part 131, a second pressing part 132, and a third pressing part 133. The first pressing part 131 is intended to press the central part with respect to the protrusion parts 43, 93 (heat-deformed parts 42, 92 after heat deformation) of the spacers 40, 90 in the longitudinal direction X of the spacers 40, 90. The second pressing part 132 extends from the first pressing part 131 and reaches a part outwardly with respect to the protrusion parts 43, 93 (heat-deformed parts 42, 92 after heat deformation) along the elongated or longitudinal direction of the spacers 40, 90. The third pressing part extends from the second pressing part in a direction Y perpendicular to the elongated or longitudinal direction X of the support member to pass over the heat-deformed parts 42, 92 after heat deformation so as to reach the outermost end 42A, 92A in the perpendicular direction of the heat-formed parts 42, 92 (see FIG. 14).

As shown in FIG. 7, the cooling unit 160 includes a nozzle 161 that can discharge the cooling gas. The cooling gas is air in this embodiment, but is not limited to air. For example a rare gas or the like may be used.

As shown in FIG. 6, the control unit 170 integrally controls the conveying means 140, the heating unit 120, the pressurizing mechanism 150, and the cooling unit 160. The control unit 170 is composed mainly of a CPU and memory and the operation control program is stored in the memory.

Now, description is given of the coupling method for coupling the spacers 40, 90 to the battery cell 10 by the battery coupling device 100 pertaining to the battery coupling device 100.

First, as shown in FIGS. 6 to 9, the spacers 40, 90 are mounted on the pallet 110 so that the spacer fixing pin 111 passes through the through holes 41, 91 of the spacers 40, 90. Then, while maintaining the state in which the through holes 16 of the battery cell 10 are penetrated by the protrusion parts 43 and 93 of the spacers 40, 90, the battery cell 10 is placed on the pallet 110.

Subsequently, the pallet 110 is conveyed until the protrusion parts 43 and 93 of the spacers 40 and 90 will be positioned directly below the heating unit 120. Upon the protrusion parts 43, 93 of the spacers 40, 90 being positioned directly below the heating unit 120, the conveying unit 140 is stopped and the support beam 152 is lowered by operating the pressing unit 151.

Figure 10:
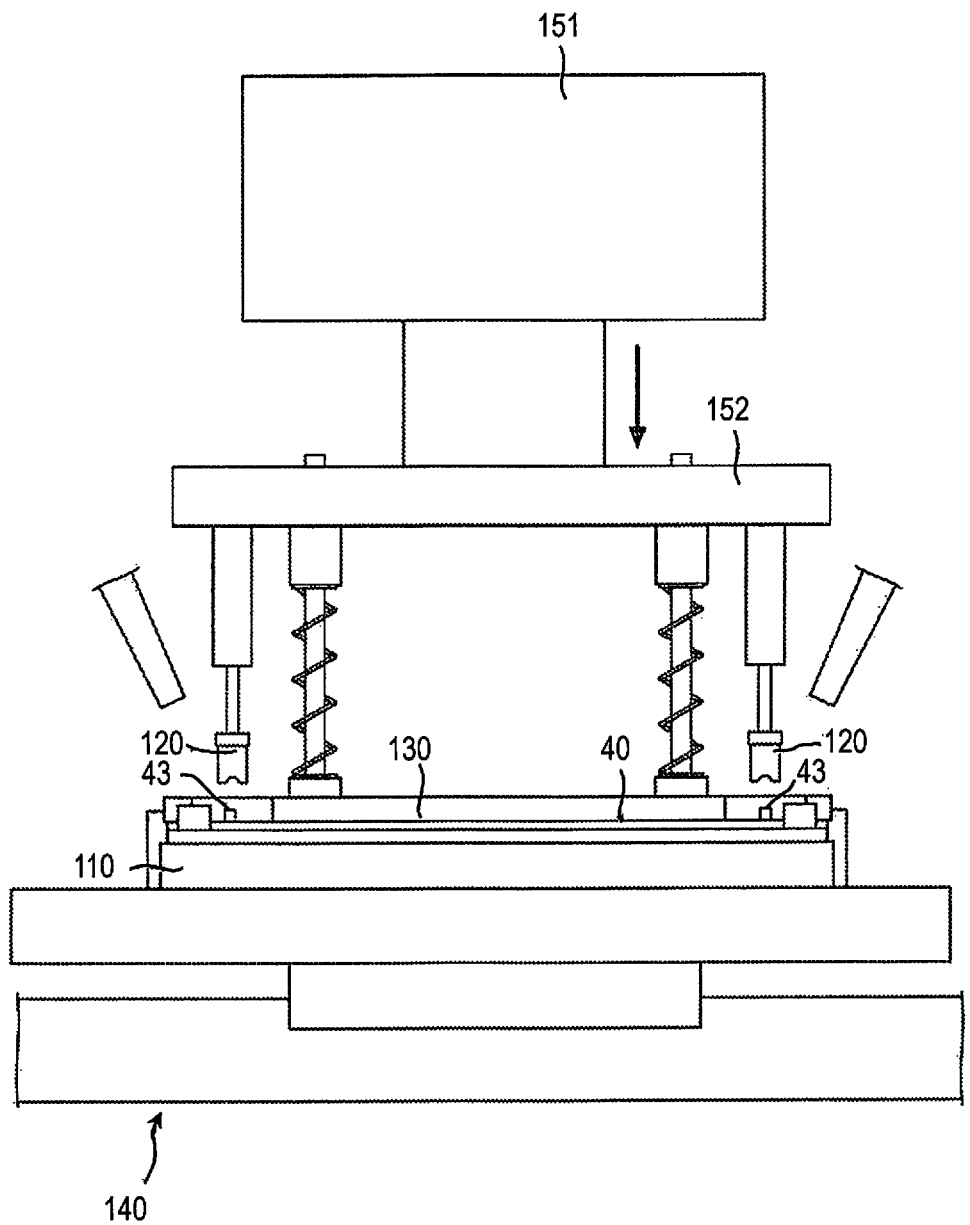
FIG. 10 is a plan view showing a state in which the spacer is pressurized by the pressing piece.
Figure 11:
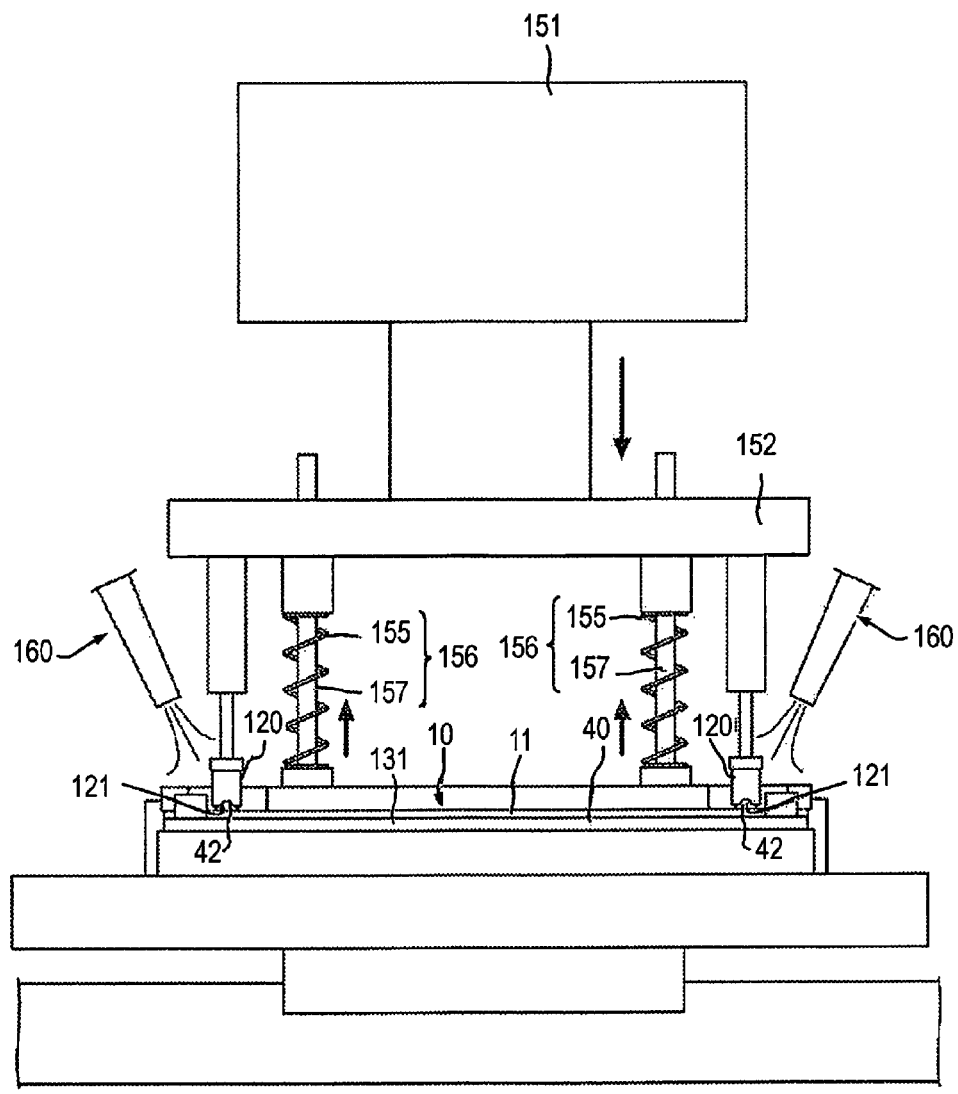
FIG. 11 is a plan view showing a state in which a protrusion part is pressurized by the pressing piece to impart a heat deformation.

When the support beam 152 is lowered, as shown in FIG. 10, the pressing piece 130 contacts the spacers 40, 90 to suppress inadvertent movement of the spacers 40 and 90 (pressing step S11). With further lowering of the support beam 152, as shown in FIG. 11, the spring 155 of the spring mechanism 156 is contracted to cause the heating unit 120 to pressurize the protrusion parts 43, 93 from the tip side of the protrusion parts 43, 93. The heating unit 120 is heated to a temperature at which the spacers 40, 90 are molten or softened so that the pressurized protrusion parts 43, 93 are heat deformed along the shape of the recess 121 of the heating unit 120 (heating step S12). Thereafter, cooling air is blown to the heating unit 120 by actuation of the cooling unit 160, which solidifies on cooling the part heat deformed to form a heat-deformed part 42 (cooling step S13). The heat-deformed part 42 is heat deformed to acquire a size which prevents extraction or withdrawal from the hole 16 of the exterior member 11 so couple the battery cell 10 and the spacers 40, 90. In the cooling step S13, because the circumference of the heating unit 120 is not completely covered due to a gap between the first pressing part 131 and the third pressing part 133, a quick cooling may be ensured.

Figure 12:
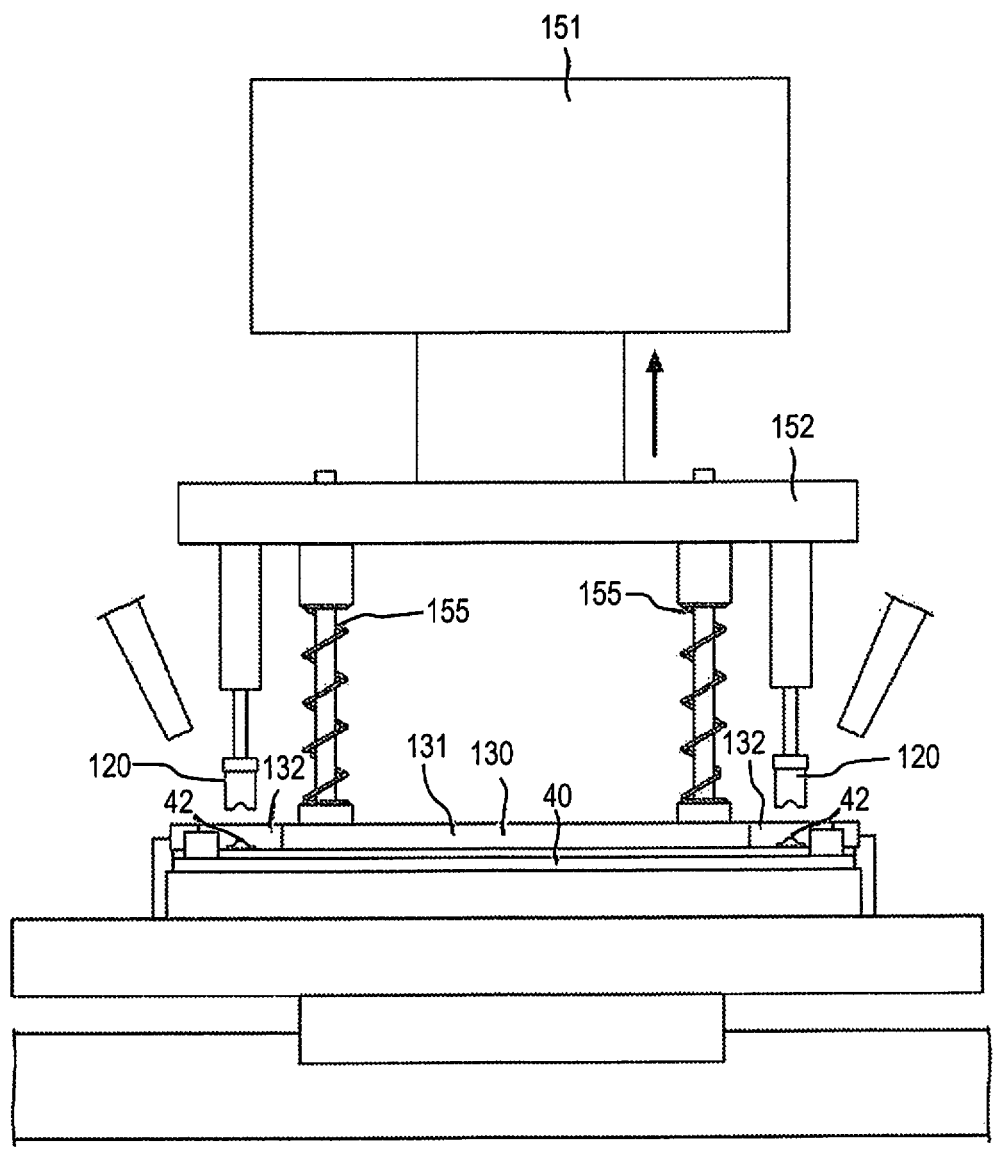
FIG. 12 is a plan view showing a state in which the heating unit is separated from the spacer.
Figure 14:
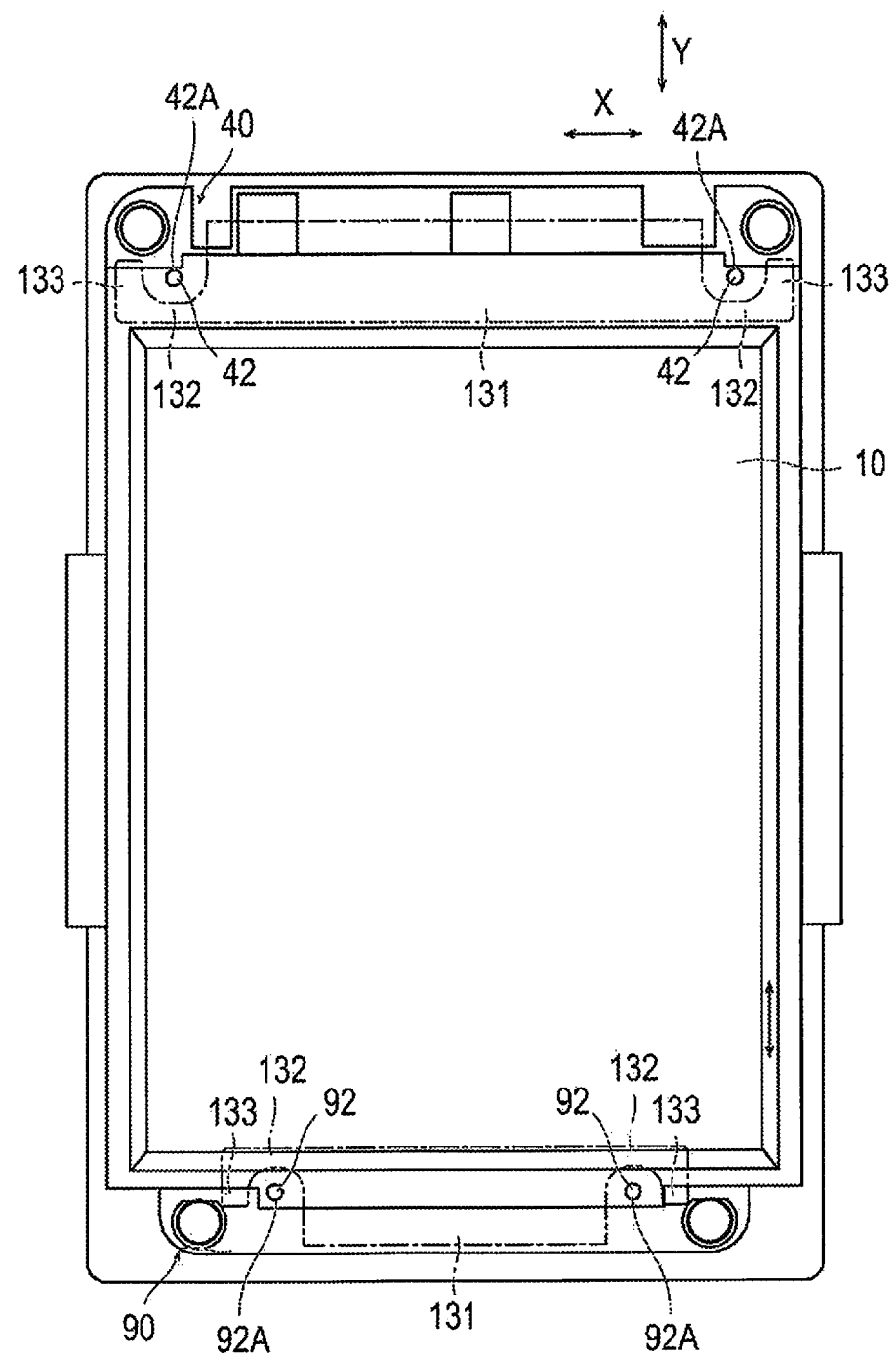
FIG. 14 is a plan view of a battery after the heat-deformed part has been formed.

Next, as shown in FIG. 12, when the support beam 152 is raised by the pressing unit 151, due to expansion of the spring 155 which has been contracted, while the spacers 40, 90 are pressed by the pressing piece 130, the heating unit 120 will be separated or detached from the heat-deformed part 42 (heating unit separation step S14). Thus, during the time of raising the heating unit 120, the spacers 40, 90 will be prevented from floating or being lifted and the undesirable force would less likely act on the spacers 40, 90 so that the heat-deformed parts 42, 92 which is in a state of fusion to the heating unit 120 151 may be peeled off or separated with ease. Therefore, it is possible to prevent the breakage occurs in the heat-deformed parts 42, 92 of the spacers 40 and 90 and relevant parts. Moreover, as shown in FIG. 14, since the pressing piece 130 presses the heat-deformed parts 42, 92 by the first pressing part at the central part of the spacers 40, 90 in the longitudinal direction X while pressing the outer part by the second pressing part 132 to thereby press both sides of the heat-deformed parts 42, 92, it is possible to suppress the damage of the heat-deformed parts 42, 92 and the like. Further, since the third pressing part 133 extends from the second pressing part 132 in a direction Y perpendicular to the elongated or longitudinal direction X of the spacers 40, 90 to pass over the heat-deformed parts 42, 92 so as to reach the outermost ends 42A, 92A in the perpendicular direction of the heat-formed parts 42, 92, the undesirable force is less likely exert on the heat-deformed parts 42, 92. Therefore, the heat-deformed parts 42, 92 can be easily removed from the heating unit 120 so that it is possible to more reliably suppress damage to the heat-deformed parts 42, 92 and the like.

Figure 13:
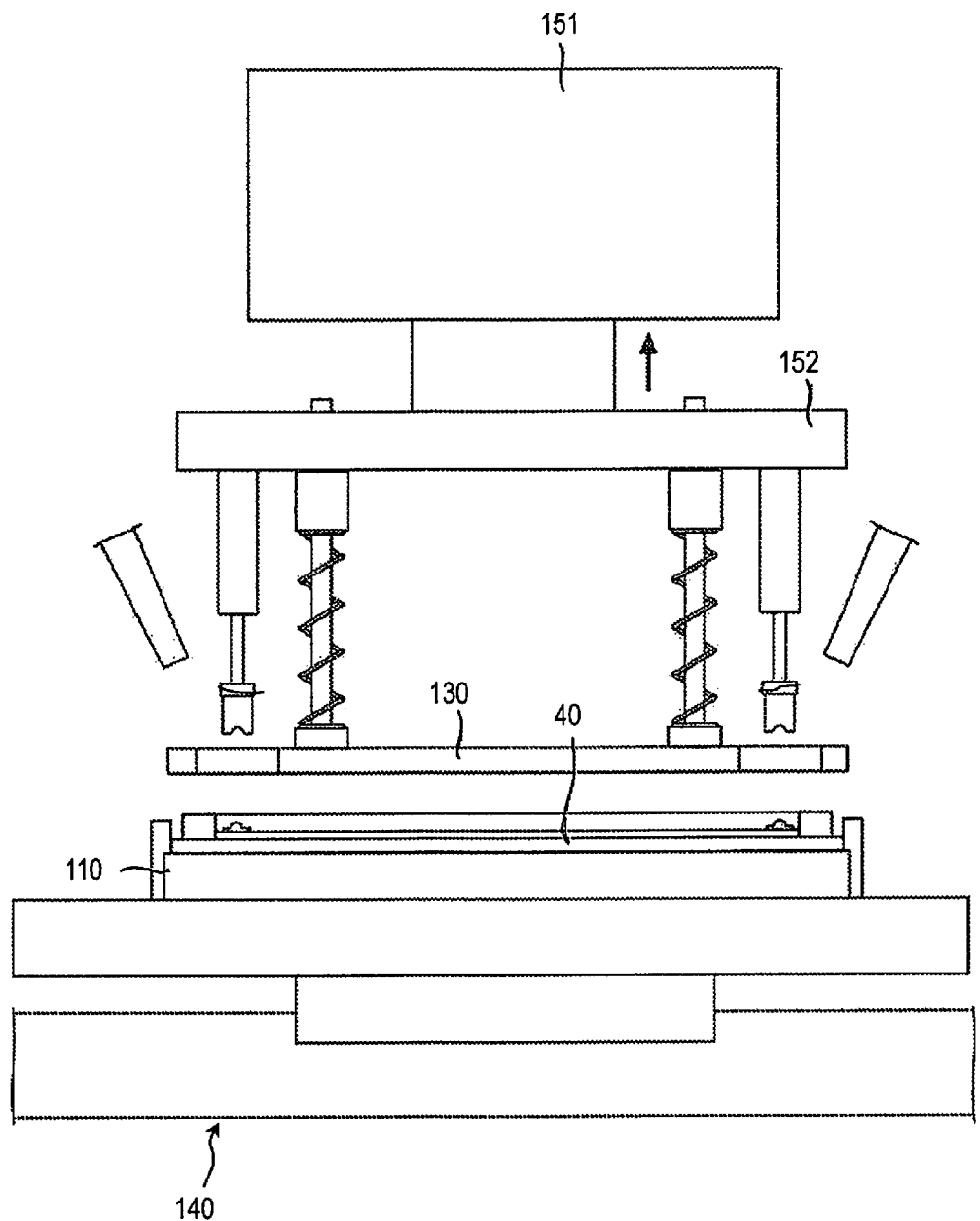
FIG. 13 is a plan view showing a state in which the pressing piece is separated from the spacer.

Then, as shown in FIG. 13, when the support beam 152 is further raised by the pressing unit 151, the pressing piece 130 is separated from the spacers 40, 90 (holding unit separation step S15). Thereafter, the pallet is transferred by the transport means 140 to the next step.

As described above, according to the present exemplary embodiment, the steps for coupling the spacers 40, 90 to the battery cell 10 includes a pressing step S11, a heating step S12, a heating unit separation step S14, and a pressing piece separation step S15. In the heating step S12, protrusion parts 43, 93 formed on the spacers 40, 90 are caused to pass through the hole 16 formed in the battery cell 10 and the protrusion parts 43, 93 are subsequently pressurized by the heating unit 120 from the tip side of the protrusion parts 43, 93 to form heat-deformed parts 42, 92 which has a size which prevents from extraction or withdrawal from the hole 16. In the pressing step S11, the spacers 40, 90 are pressurized by the pressing piece 130, which approaches and presses the spacers 40, 90 from the side where the heating unit 120 is positioned. In the heating unit separation step S14, after the pressing step S11, the heating unit 120 is separated from the heat-deformed parts 42, 92. In the pressing piece separation step S15, after the heating unit separation step S14, the pressing piece 130 is separated from the spacers 40, 90. Thus, when raising the heating unit 120, the spacers 40, 90 are held pressed by the pressing piece 130 without being lifted and the undesirable force is less likely act on the spacers 40, 90 so that the heat-deformed parts 42, 92 which are found in a state of fusion to the heating unit 120 may be peeled off from the heating unit 120 easily. Therefore, when separating the heating unit 120 from the heat-deformed parts 42, 92, it is possible to suppress occurrence of breakage in the heat-deformed parts 42, 92 or the like.

Further, both the heating unit 120 and the pressing piece 130 are operated jointly or cooperatively by the same pressurizing mechanism 150. Thus, the configuration is easy, and cost reduction and space saving may be achieved.

Further, the pressing piece 130 comprises a first pressing part 131 that presses the heat-deformed parts 42, 92 of the spacers 40, 90 at the central part along the longitudinal or elongated direction X of the spacers 40, 90 and a second pressing part 132 that extends from the first pressing part 131 to a part outwardly with respect to the heat-deformed parts 42, 92 along the longitudinal or elongated direction X of the spacers 40, 90. Further, the spacers 40, 90 are pressurized by the first pressing part 131 and the second pressing part 132. Thus, both sides of the heat-deformed parts 42, 92 in the longitudinal or elongated direction X may be pressurized so that the undesirable force is less likely act and the breakage due to heat-deformed parts 42, 92 an the like may be suppressed.

Further, the pressing piece 130 further comprises a third pressing part 133 that extends from the second pressing part 132 in a direction Y perpendicular to the elongated or longitudinal direction X of the spacers 40, 90 to pass over the heat-deformed parts 42, 92 so as to reach the most outward ends 42A, 92A in the perpendicular direction of the heat-formed parts 42, 92. In addition, the spacers 40, 90 are pressed by the first pressing part 131, the second pressing part 132 and the third pressing part 133.

Therefore, it is less likely that undesirable force would act on heat-deformed parts 42, 92 so that the heat-deformed parts 42, 92 fused to the heating unit 120 may be peeled off more reliably.

MODIFICATION

Figure 15:
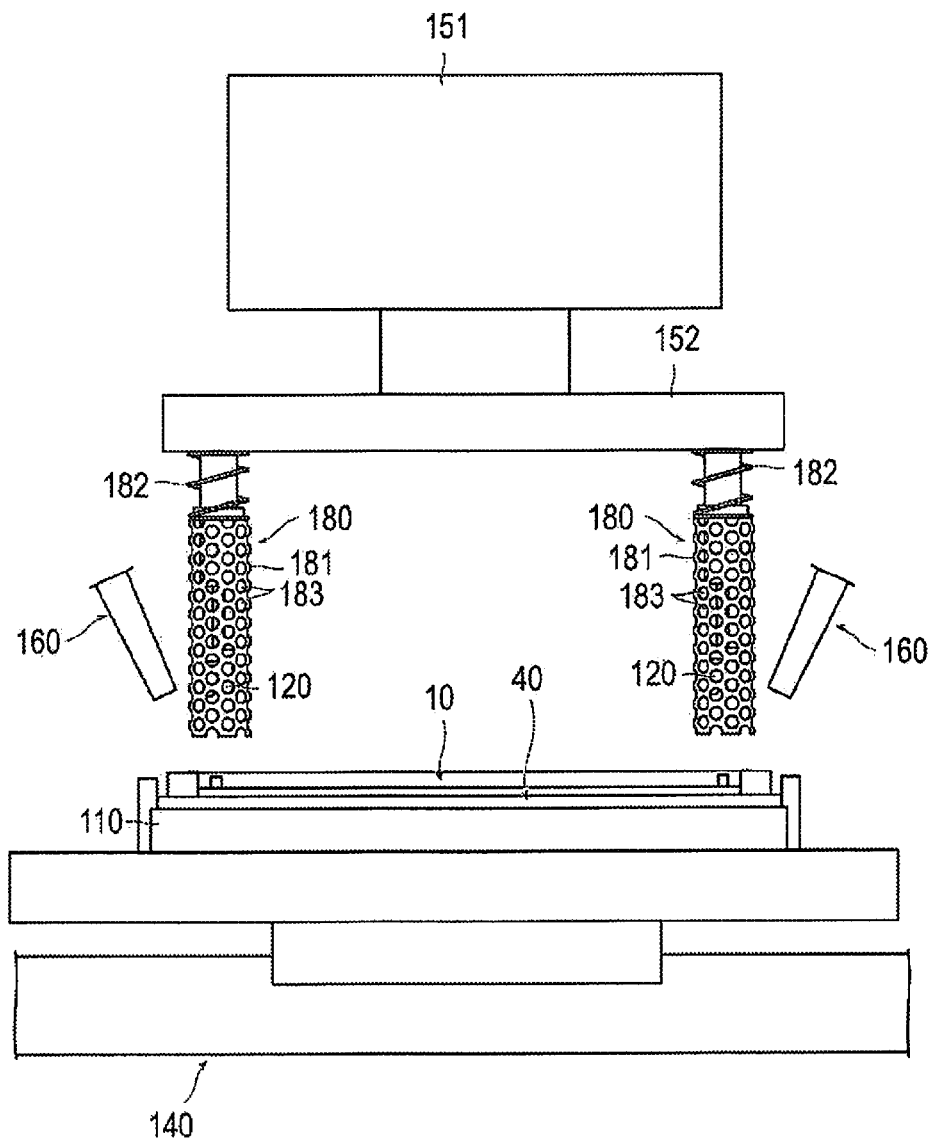
FIG. 15 is a front view showing a modification of the battery coupling device according to an exemplary embodiment.

The present invention and is not limited to the embodiments described above, but may be modified appropriately. For example, the configuration of the spacers 40, 90 is not limited as long as the pressing function is assured. For example, the first to third pressing parts 131, 132, and 133 may be replaced by one or two pressing pieces. Alternatively, as shown in the modification in FIG. 15, a pressing piece 180 may be provided with a cylindrical portion 181 covering the periphery of the heating unit 120. The cylindrical portion 181 is held for a back and forth movement with respect to the support beam 152 by a spring 182. Further, in order to increase the cooling capacity of the cooling step S13, the cylindrical portion 181 is formed with a plurality of holes 183. Thus, by covering the entire periphery of the heating unit 120, it is possible to more reliably suppress floating of spacers 40, 90 as well as damage to the heat-deformed parts 42, 92 and the like.

Further, the pressing piece 130 may be configured to press the spacers 40, 90 via a battery cell 10, i.e., without being in direct contact therewith as long as the spacers 40, 90 may be pressurized.

Further, in the present embodiment, the pressing step S11 is performed prior to the heating step S12, it may be configured to perform the heating step S12 prior to the pressing step S11. The cooling step S13 does not have to be necessarily provided.

The invention claimed is:

1. A battery coupling method for coupling a support member to a battery cell for supporting the battery cell provided with a group of electrodes, the battery coupling method comprising:
   passing a protrusion part formed on the support member through a hole formed in the battery cell;
   moving a support beam supporting a pressing piece and a heating unit toward the support member until the pressing piece contacts the support member, the heating unit being arranged and configured to move toward the protrusion part and the pressing piece being arranged and configured to move toward a portion of the support member other than the protrusion part;

moving the support beam further toward the support member such that the pressing piece presses the support member while the heating unit remains separated from the protrusion part;

moving the support beam further toward the support member such that the heating unit contacts a tip end of the protrusion part;

heating the tip end of the protrusion part using the heating unit such that at least a portion of the tip end of the protrusion part that protrudes from the hole forms a heat-deformed part of a size which prevents extraction of the protrusion part from the hole;

moving the support from the support member such that the heating unit separates from the heat-deformed part while the pressing piece presses the support member after the pressing and heating of the tip end of the protrusion part; and moving the support beam further away from the support member such that the pressing piece separates from the support member after the heating unit has separated from the heat-deformed part.

2. The battery coupling method as claimed in claim 1, wherein
the pressing of the support member and the heating of the tip end of the protrusion part are performed by cooperatively using a single pressurizing mechanism to operate the heating unit and the pressing piece.

3. The battery coupling method as claimed in claim 2, wherein
the support member is configured to be longer in a longitudinal direction than in a widthwise direction, the widthwise direction being perpendicular to the longitudinal direction, and the pressing of the support member includes pressing the support member with a first pressing part of the pressing piece that presses the support member at a position closer to a central part of the support member along the longitudinal direction than the heat-deformed part of the support member, and pressing the support member with a second pressing part of the pressing piece that extends from the first pressing part to a part of the support member positioned outwardly away from the central part with respect to the heat-deformed part along the longitudinal direction of the support member.

4. The battery coupling method as claimed in claim 1, wherein
the support member is configured to be longer in a longitudinal direction than in a widthwise direction, the widthwise direction being perpendicular to the longitudinal direction, and the pressing of the support member includes pressing the support member with a first pressing part of the pressing piece that presses the support member at a position closer to a central part of the support member along the longitudinal direction than the heat-deformed part of the support member, and pressing the support member with a second pressing part of the pressing piece that extends from the first pressing part to a part of the support member positioned outwardly away from the central part with respect to the heat-deformed part along the longitudinal direction of the support member.

5. The battery coupling method as claimed in claim 4, wherein
the pressing of the support member further includes pressing of the support member with a third pressing part of the pressing piece that extends outward from the second pressing part in the widthwise direction of the support member so as to pass by the heat-deformed part and reach a position beyond an outermost edge of the heat-formed part in the widthwise direction.

\* \* \* \* \*